UNITED STATES PATENT OFFICE.

ELIZUR D. SEAVEY, HENRY M. SEAVEY, AND WILLIAM C. SEAVEY, OF CHICAGO, ILLINOIS.

PLASTIC STOVE-LINING.

SPECIFICATION forming part of Letters Patent No. 309,570, dated December 23, 1884.

Application filed May 31, 1884. (No specimens.)

*To all whom it may concern:*

Be it known that we, ELIZUR D. SEAVEY, HENRY M. SEAVEY, and WILLIAM C. SEAVEY, citizens of the United States, residing at the city of Chicago, in the State of Illinois, have invented a new and useful Improvement in Plastic Stove-Linings, of which the following is the specification.

The object of this invention is to produce a plastic stove-lining, which in a plastic condition can be placed in position in the fire-box of any stove or furnace, and highly refractory in character, and capable of successfully resisting the action of heat.

In making our plastic stove-lining we use the following ingredients, and compound them in about the following proportions: Forty-five (45) per cent. of ground fire-clay, forty (40) per cent. of ground fire-clay brick, five (5) per cent. of wood sawdust, five (5) per cent. of chloride of sodium, two (2) per cent. of potash, three (3) per cent. of silex. The above ingredients are thoroughly mixed until they become a heterogeneous mass. In order to form blocks or cakes for convenience of handling, packing, and shipping, a little water is added, which soon evaporates and leaves the compound in any-sized blocks or cake desired.

To apply our plastic lining to the fire-box, it is moistened with a little water, and worked into a mortar or plastic condition, when, by the direct use of the hand or trowel, it can be applied to the surface of the fire-box. After being applied it should be allowed to stand until it is dried before it is subjected to use. Under the action of fire the salt and potash vitrify, and form a glazed surface or coating on the lining, which largely prevents slag adhering to the surface. The wood sawdust is mechanical in its action. The heat from the fire consumes the wooden particles forming the sawdust, and the space thus occupied becomes an air-cell, and thus adds largely to the non-conductivity of the lining.

We have found by experience that a plastic stove-lining made as herein shown is serviceable, cheap, and can be readily applied by any one.

We claim—

As an article of manufacture, a plastic stove-lining composed of ground fire-clay, ground fire-brick, wood sawdust, chloride of sodium, potash, and silex, all compounded and mixed substantially in the proportions and in the manner herein shown.

ELIZUR D. SEAVEY.
    HENRY M. SEAVEY.
    WILLIAM C. SEAVEY.

Witnesses:
 J. A. COWLES,
 G. J. TRINKETT.